United States Patent [19]

Rubino

[11] Patent Number: 4,572,104
[45] Date of Patent: Feb. 25, 1986

[54] METHOD OF MILKING
[75] Inventor: Daniel A. Rubino, Oak Brook, Ill.
[73] Assignee: Babson Bros. Co., Oak Brook, Ill.
[21] Appl. No.: 720,049
[22] Filed: Apr. 4, 1985

Related U.S. Application Data

[63] Continuation-in-part of Ser. No. 557,251, Dec. 1, 1983, abandoned.

[51] Int. Cl.[4] .................................................. A01J 5/04
[52] U.S. Cl. ................................ 119/14.02; 119/14.14
[58] Field of Search ............... 119/14.02, 14.08, 14.17, 119/14.14, 14.28, 14.41

[56] References Cited

U.S. PATENT DOCUMENTS

| | | | |
|---|---|---|---|
| 3,117,553 | 1/1964 | Dujardin et al. | 119/14.28 |
| 3,172,391 | 3/1965 | Norton | 119/14.28 |
| 3,317,685 | 5/1967 | Babson | 200/19 |
| 3,703,645 | 11/1972 | Swift | 119/14.28 X |
| 4,011,838 | 3/1977 | Nordegren et al. | 119/14.08 |
| 4,292,926 | 10/1981 | Tilman | 119/14.02 |

Primary Examiner—Hugh R. Chamblee
Attorney, Agent, or Firm—Wood, Dalton, Phillips, Mason & Rowe

[57] ABSTRACT

A method of milking is disclosed for a double action milking system having teat cups which alternate time periods of release and squeeze of the teat to allow milk to flow and to provide for rest respectively. Milking is initiated at one ratio of milk period to rest period and then increased to a selected higher ratio. Milking is then done at the selected higher ratio for a selected segment of time or until the milk flow rate falls below a predetermined value, after which the ratio is decreased so that milking is completed at a lower ratio.

33 Claims, 3 Drawing Figures

METHOD OF MILKING

DESCRIPTION

This application is a continuation-in-part of application Ser. No. 557,251, filed Dec. 1, 1983, now abandoned.

BACKGROUND OF THE INVENTION

1. Technical Field

This invention relates to a method of milking a cow, and more particularly to a method for safely machine milking a cow at a maximized rate of milking.

2. Background Art

Milking machines are, of course, common in the art. These machines use teat cups which are attached to the cow's teats and a constant vacuum in the teat cup draws the milk from the cow teat. However, since continuous milking would irritate the cow, the teat cups have had flexible liners or inflations which alternately squeeze and release the teat to provide for alternate periods of rest and milk flow. Specifically, when the liner squeezes the teat, it closes off the teat so that the vacuum will not draw milk through the teat, thereby providing a period of rest which not only prevents physical injury to the teats but also facilitates the flow of milk in the cow's udder. When the liner releases the teat, that milk is then drawn out by the vacuum.

In the prior art, this cycle has been generally 50% milk period (releasing the teat) and 50% rest period (squeezing the teat). Systems have been provided in which the ratio of milk period to rest period can be adjusted. Such a system is shown, for example, in U.S. Pat. No. 3,317,685. However, while these systems have allowed for the ratio of milk period to rest period to be increased from 50:50 to increase the amount per cycle of (and thus the rate of) milking, they are constrained by the risk of hurting the cow by not providing sufficient periods of rest.

The present invention is directed toward overcoming one or more of the problems as set forth above.

SUMMARY OF THE INVENTION

In one aspect of the present invention, a method of milking is disclosed for a double action milking system having teat cups which alternate time periods of release and squeeze of the teat to allow milk to flow and to provide for rest respectively. Milking is done at a selected ratio of milk period to rest period for a selected period of time or until the milk flow rate falls below a predetermined value, after which the ratio is decreased so that milking is completed at a lower ratio.

In another aspect of the present invention, milking is initiated at one ratio and then increased to the selected higher ratio, and milking is done at the selected higher ratio for the selected period of time or until the milk flow rate falls below a predetermined value before being decreased for the completion of milking.

With the present invention, the rate of milking a cow may be substantially maximized while still avoiding physical injury to the cow. During the first part of milking, when the cow's udder is fullest with milk, greater periods of milking versus rest are used to maximize the rate of milking. At this time, the ratio of milk period to rest period may be selected basically to facilitate the flow of milk in the udder, as there is only minimal danger of hurting the cow. After a certain period of milking, as the milk decreases in the cow's udder, the ratio of milk period to rest period is decreased to avoid hurting the cow as that is when the danger is most present.

With the present method of milking, a substantially reduction in milking time may be accomplished.

DESCRIPTION OF THE PREFERRED EMBODIMENT

Figure 1:
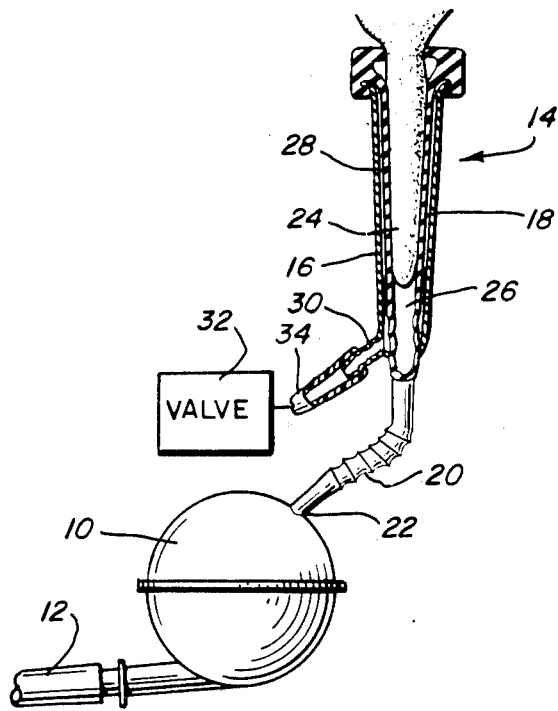
FIG. 1 is partial view of a double action milker which may be used to milk a cow by the inventive method.

A portion of a double action milking system is shown in FIG. 1. A milk bowl 10 is connected to a milk hose 12 through which a vacuum is induced. Illustated in FIG. 1 is a single teat cup 14 connected to the milk bowl 10, though it should be understood that four such teat cups 14 are generally associated with a milk bowl 10, one teat cup 14 for each quarter of the cow's udder. The teat cup 14 includes a rigid shell 16 and flexible liner or inflation 18 with a stem 20 connected to a nipple 22 on the bowl 10. The teat cup 14 is supported on a cow teat 24 and thus the vacuum from the milk bowl 10 in the space 26 beneath the teat 24, helps to support the teat cup 14 on the teat 24 as well as drawing the milk out through the teat 24.

An annular space 28 is defined between the shell 16 and the liner 18 and a nipple 30 is provided on the shell 16 connecting the space 28 to a valve 32 through a flexible line 34. The valve 32 alternately connects the line 34, and thus the annular space 28, to an atmospheric pressure or a vacuum.

When the valve 32 connects the vacuum to the line 34, the liner 18 is drawn out toward the shell 16, releasing the teat 24. The teat 24 is therefore open so that the vacuum in the space 26 beneath it draws milk down through the teat 24 from the cow udder, into the milk receiver 10 and through the milk hose 12 to the collection point.

When atmospheric pressure is connected to the line 34, the space 28 inflates and causes the liner 18 to squeeze the teat 24. This closes off the teat 24 so that the vacuum in the bowl 10 does not draw milk from the udder, thereby providing a period of rest during which the natural flow of milk down in the udder to the teat 24 can take place.

These cycles of alternate milk and rest periods are generally repeated about 60 times per minute. The cycles of the operation on the front quarter teats with some systems have also had a 180° phase shift from the cycles of operation on the rear quarter teats, so that the front quarter teats are milked while the rear quarter teats rest and vice versa.

The previously described system and its method of operation are known. The ratio of milk period to rest period during the cycles in these operations has generally been about 50:50 though milk systems have been adjustable to operate at different ratios. While the ratio has been increased above 50:50 to increase the rate of milking, such increases risk injury to the cow.

Figure 2:
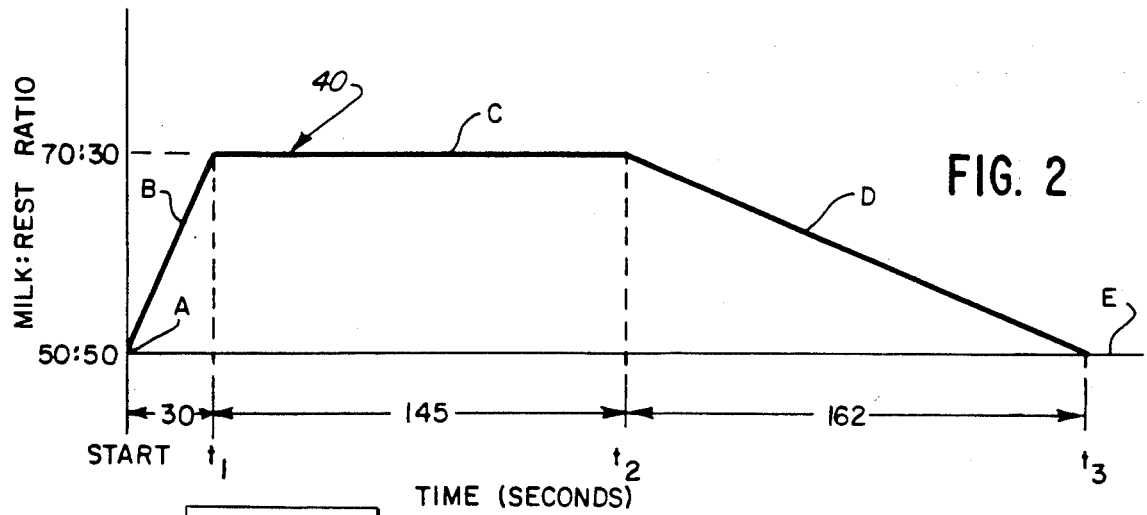
FIG. 2 is a chart showing the preferred milk:rest ratio during the milking of a cow.

The inventive method of milking is illustrated in FIG. 2, with the graph 40 showing details of the preferred embodiment. Milking is initiated (A) with the ratio of milk period to rest period at 50:50. During the first 30 seconds of operation (B), the ratio is steadily increased to 70:30. Operation then continues for the next 145 seconds (C) with the ratio at 70% milk period to 30% rest period. During this 145 second time segment, milking is done at a maximum rate since, during this time segment, the cow's udder is relatively full and thus the risk of injury to the cow due to the greater milking periods is minimal. The 30% rest period is selected as being that which will best facilitate the flow of milk during this early portion of milking.

After 145 seconds at a ratio of 70:30, the ratio of milk period to rest period is steadily decreased back to 50:50 over a 162 second time segment (D). This is done because continued milking of the cow at a ratio of milk period to rest period of 70:30 could injure the cow after the 145 second time segment since the rate of milk flow from the cow decreases. After the 162 second time segment, operation continues at a rate of 50:50 until milking of the cow is completed (E). Completion of milking is detected by a suitable milk flow rate sensor 42 (see FIG. 3).

With this method of milking, the rate of milking is maximized without injuring the cow. The portion of the operation during which milk is drawn from the cow is adjusted so as to be maximized when the udder is most full of milk, and is decreased to a safe level as the cow's udder empties.

Figure 3:
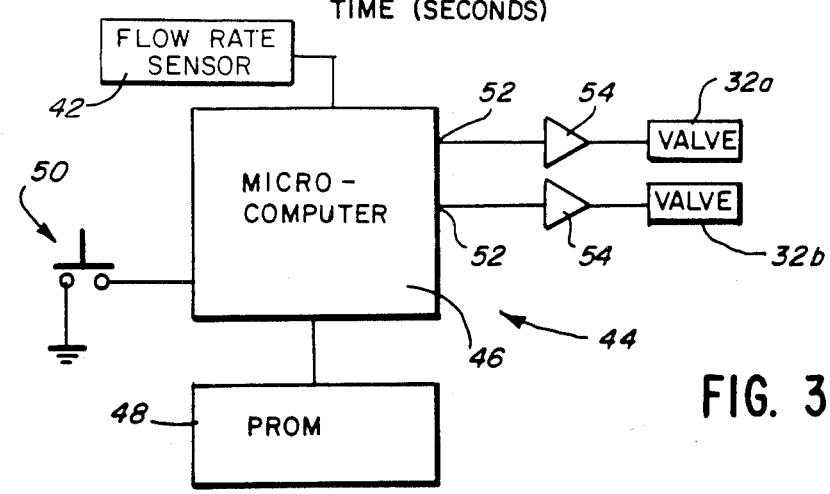
FIG. 3 is a simplified schematic view of a control for use with a milking machine in practicing the present method.

A control system 44 for operating a milking system to milk a cow by the method of the present invention is illustrated in FIG. 3. The control system 44 includes a microcomputer 46 and a programmable read-only memory (PROM) 48. The PROM 48 is programmed with the desired method of operation (as illustrated in FIG. 2).

The milk flow rate sensor 42 is connected to the microcomputer 46 to input signals reflecting the milk flow rate. These signals may be used to determine when to stop milking as previously noted, and may also be used to determine when to end time segment (C) as is further discussed below.

A start switch 50 is used to activate the program which generate signals at the computer outputs 52, which signals are amplified by amplifiers 54. In FIG. 3, two outputs 52 are shown as controlling valves 32a,32b to alternately connect pressurized air and vacuum to the annular space 28 in the shell 16 (FIG. 1) to squeeze and to release the teats 24 respectively. One output is used to control the valve 32a to the teat cups on the front quarter teats and the other to control the valve 32b to the teat cups on the rear quarter teats. In the preferred embodiment, the cycles of operation on the front quarter teats are phase-shifted 180° from the cycles of operation on the rear quarter teats to minimize the length of periods during which all four quarter teats are in a milk period. Thus, during operation at the ratio of milk period to rest period of 70:30, during a single cycle there are two occasions, each lasting 20% of the cycle, during which all four quarter teats are being milked.

The method of operation described above may also be varied by terminating time segment (C) (of maximum rate of milking) in response to a reduction in the milk flow rate. That is, rather than ending time segment (C) after a selected amount of time such as 145 seconds as shown in the FIG. 2 embodiment, time segment (C) would be ended whenever the milk flow rate falls below a predetermined value, as detected by the sensor 42. Operation in this manner allows milking efficiency to be optimized by taking into account the milking characteristics of each cow as it is milked.

With the present method of milking, fast, safe milking may be accomplished. Other aspects, objects and advantages of the present invention will become apparent from a study of the drawings, the specification and the appended claims.

I claim:

1. In a double action milking system having an apparatus for connection with a cow's teats to apply a continuous vacuum to the end of the teat to remove milk therefrom and for establishing alternate time periods of release and squeeze of the teat to allow milk to flow and to provide for rest respectively, the method of operation comprising the steps of:
   milking at a first selected ratio of milk period to rest period; and
   thereafter gradually decreasing the ratio of the milk period to the rest period to a second selected ratio.

2. The method of claim 1, wherein milking is initiated at a lower ratio of milk period to rest period than the first selected ratio, and the ratio is then gradually increased to the first selected ratio.

3. The method of claim 1, wherein the decreasing step is begun when the milk flow during milking falls below a selected flow rate.

4. The method of claim 1, wherein the first selected ratio is substantially the ratio at which the maximum rate of milking of the cow will occur.

5. The method of claim 4, wherein the first selected ratio of milk period to rest period is approximately 70:30.

6. The method of claim 1, wherein milking at the first selected ratio is done for a selected segment of time.

7. The method of claim 6, wherein the selected time segment for milking at the first selected ratio of milk period to rest period is the time segment after which continued milking of the cow at the first selected ratio would irritate the cow teats.

8. In a double action milking system having an apparatus for connection with a cow's teats to apply a continuous vacuum to the end of the teat to remove milk therefrom and for establishing alternate time periods of release and squeeze of the teat to allow milk flow and to provide for rest respectively, the method of operation comprising the steps of:
   initiating milking at a first ratio of milk period to rest period;
   gradually increasing the ratio of the milk period to rest period to a second ratio;
   milking at the second ratio of milk period to rest period; and
   thereafter gradually decreasing the ratio of the milk period to the rest period.

9. The method of claim 8, wherein the decreasing step is begun when the milk flow during milking falls below a selected flow rate.

10. The method of claim 8, wherein the second ratio of milk period to rest period is approximately 70:30.

11. The method of claim 10, where the 70:30 ratio is maintained for a time segment of operation on the order of 145 seconds.

12. The method of claim 8, wherein the increasing step occurs at a substantially uniform rate over a selected segment of time.

13. The method of claim 12, wherein the decreasing step occurs at a substantially uniform rate over a second selected segment of time.

14. The method of claim 12, wherein the second ratio of milk period to rest period is maintained at approximately 70:30 during the milking step.

15. In a double action milking system having an apparatus for connection with a cow's teats to apply a continuous vacuum to the end of the teat to remove milk therefrom and for establishing alternate time periods with the teat released to allow milk to flow and with the teat squeezed to provide for rest, the method comprising the steps of:
    initiating milking at a first selected ratio of milk period to rest period;
    gradually increasing the ratio of milk period to rest period to a second selected ratio over a first selected segment of time;
    maintaining the ratio of milk period to rest period at the second selected ratio;
    gradually decreasing the ratio of milk period to rest period to a third selected ratio; and
    maintaining the ratio of milk period to rest period at the third selected ratio until milking of the cow is completed.

16. The method of claim 15, wherein the first and third selected ratios are the same.

17. The method of claim 15, wherein the second selected ratio is on the order of 70% milk period to 30% rest period.

18. The method of claim 15, wherein the third selected ratio is on the order of 50% milk period to 50% rest period.

19. The method of claim 15, wherein the ratio of milk period to rest period is increased at a substantially uniform rate during the first selected segment of time.

20. The method of claim 15, wherein the ratio of milk period to rest period is decreased at a substantially uniform rate during the decreasing step.

21. The method of claim 15, wherein the decreasing step begins before milking at the second selected ratio irritates the cow teats.

22. The method of claim 15, wherein the first selected segment of time is on the order of 30 seconds.

23. The method of claim 15, wherein the decreasing step is begun when the milk flow during milking falls below a selected flow rate.

24. The method of claim 15, wherein the decreasing step is accomplished in on the order of 162 seconds.

25. The method of claim 24, wherein the phase shift in cycles of operation on the front quarters and rear quarters is substantially 180°.

26. The method of claim 15, wherein the second selected ratio is maintained for a second selected segment of time.

27. The method of claim 26, wherein the second selected segment of time is on the order of 145 seconds.

28. In a double action milking system having an apparatus for connection with the front quarter teats and rear quarter teats of a cow to apply a continuous vacuum to the ends of the teats to remove milk therefrom, said system having cycles of alternate time periods of release and squeeze of the teats to allow milk to flow and to provide for rest respectively, the method of operation comprising for both the front quarters and the rear quarters the steps of:
    initiating milking at a first ratio of milk period to rest period;
    increasing the ratio of milk period to rest period to a second selected ratio;
    maintaining the ratio of milk period to rest period at the second selected ratio;
    decreasing the ratio of milk period to rest period to a third selected ratio; and
    maintaining the ratio of milk period to rest period at the third selected ratio until the completion of milking;
    wherein the cycles of operation on the front quarters have a phase shift from the cycles of operation on the rear quarters.

29. The method of claim 28, wherein the increasing step occurs at a substantially uniform rate over a second selected segment of time.

30. The method of claim 28, wherein the first and third selected ratios are approximately the same.

31. The method of claim 28, wherein the decreasing step is begun when the milk flow during milking falls below a selected flow rate.

32. The method of claim 28, wherein the second selected ratio is on the order of 70:30.

33. The method of claim 32, wherein the second selected ratio is maintained for on the order of 145 seconds.

* * * * *